(12) United States Patent
Shirk, Jr.

(10) Patent No.: US 7,770,910 B1
(45) Date of Patent: Aug. 10, 2010

(54) SAFETY LATCH FOR FIFTH WHEEL COUPLING

(75) Inventor: Paul W. Shirk, Jr., Goshen, IN (US)

(73) Assignee: Locjaw Safety Lock, LLC, Goshen, IN (US)

( * ) Notice: Subject to any disclaimer, the term of this patent is extended or adjusted under 35 U.S.C. 154(b) by 250 days.

(21) Appl. No.: 11/969,584

(22) Filed: Jan. 4, 2008

Related U.S. Application Data

(63) Continuation-in-part of application No. 11/465,012, filed on Aug. 16, 2006.

(51) Int. Cl.
*B62D 53/06* (2006.01)
*B62D 53/10* (2006.01)

(52) U.S. Cl. ..................... 280/433; 280/438.1

(58) Field of Classification Search ............... 280/433, 280/434, 435, 436, 437, 438.1, 439, 440, 280/441
See application file for complete search history.

(56) References Cited

U.S. PATENT DOCUMENTS

| | | | | |
|---|---|---|---|---|
| 1,968,623 A | * | 7/1934 | Swift | 280/437 |
| 3,109,669 A | * | 11/1963 | Arnett | 280/434 |
| 3,251,609 A | * | 5/1966 | Daniels | 280/434 |
| 3,251,610 A | * | 5/1966 | Chosy | 280/435 |
| 4,208,062 A | * | 6/1980 | Maassen | 280/434 |
| 4,871,182 A | * | 10/1989 | Altherr et al. | 280/434 |
| 5,472,223 A | * | 12/1995 | Hawthorne et al. | 280/437 |
| 6,092,825 A | * | 7/2000 | Flater | 280/433 |
| 6,520,527 B2 | * | 2/2003 | Laarman | 280/437 |
| 6,695,337 B1 | * | 2/2004 | Breese et al. | 280/433 |
| 7,100,935 B1 | * | 9/2006 | Dunbar | 280/433 |
| 2007/0257469 A1 | * | 11/2007 | Burns et al. | 280/433 |

\* cited by examiner

*Primary Examiner*—Kevin Hurley
*Assistant Examiner*—Marc A Scharich
(74) *Attorney, Agent, or Firm*—Botkin & Hall, LLP

(57) ABSTRACT

A fifth wheel coupling for coupling sections of a tractor-trailer articulated vehicle includes a main plate mounted on the tractor which defines a keyhole slot for receiving a kingpin mounted on the trailer. The keyhole slot terminates in a coupling aperture, and a locking mechanism movable between open and closed positions locks the kingpin in the aperture in the closed position to thereby couple the tractor and trailer together. A safety latch mounted in the keyhole slot is movable from an inactive position permitting the kingpin to move through the slot and into the aperture to an active position blocking the keyhole slot. An operating mechanism operates the locking mechanism and also moves the safety latch from the active to the inactive position to permit movement of the kingpin out of the keyhole slot when the tractor and trailer are uncoupled.

10 Claims, 12 Drawing Sheets

US 7,770,910 B1

SAFETY LATCH FOR FIFTH WHEEL COUPLING

CROSS REFERENCE TO RELATED APPLICATIONS

This application is a continuation-in-part of U.S. patent application Ser. No. 11/465,012, filed Aug. 16, 2006, the disclosure of which is hereby incorporated by reference.

BACKGROUND OF THE INVENTION

1. Field of the Invention

This invention relates to a fifth wheel coupling for joining sections of an articulated vehicle.

2. Description of the Background of the Invention

Sections of an articulated vehicle, such as the sections of a tractor-trailer combination vehicle, are commonly coupled together by a fifth wheel coupling, which includes a strike plate (normally mounted on the tractor) with a locking mechanism that captures a kingpin (normally mounted on the trailer). The fifth wheel coupling permits the tractor to pivot relative to the trailer in a manner well known to those skilled in the art. Normally, the only connection between the tractor and trailer is through the kingpin, so that if the locking mechanism fails, either through a broken component or because the locking mechanism was improperly latched, the sections of the vehicle may separate from one another, resulting in an extremely dangerous situation in which the trailer breaks away from the tractor and cannot be controlled. Obviously, in such a situation, property damage and injuries or death of bystanders is likely.

Accordingly, a safety latch that prevents unwanted separation between the tractor and trailer is desirable. However, to be effective, the latch must be engaged whenever the vehicle sections are coupled, but the safety latch must be easily inactivated to permit separation of the vehicle sections when uncoupling is desired.

SUMMARY OF THE INVENTION

A fifth wheel coupling for coupling sections of a tractor-trailer articulated vehicle includes a main plate mounted on the tractor which defines a keyhole slot for receiving a kingpin mounted on the trailer. The keyhole slot terminates in a coupling aperture, and a locking mechanism movable between open and closed positions locks the kingpin in the aperture in the closed position to thereby couple the tractor and trailer together. A safety latch mounted in the keyhole slot is movable from an inactive position permitting the kingpin to move through the slot and into the aperture to an active position blocking the keyhole slot. An operating mechanism operates the locking mechanism and also moves the safety latch from the active to the inactive position to permit movement of the kingpin out of said keyhole slot when the tractor and trailer are uncoupled. The operating mechanism includes a lever pivotally mounted on the main plate, a first linkage pivotally mounted on the lever, which connects the lever with the locking mechanism, a detent releasably holding the lever in said open position, and a second linkage for moving the safety latch into the inactive position during a portion of said stroke of said lever.

DETAILED DESCRIPTION OF INVENTION

Figure 1:
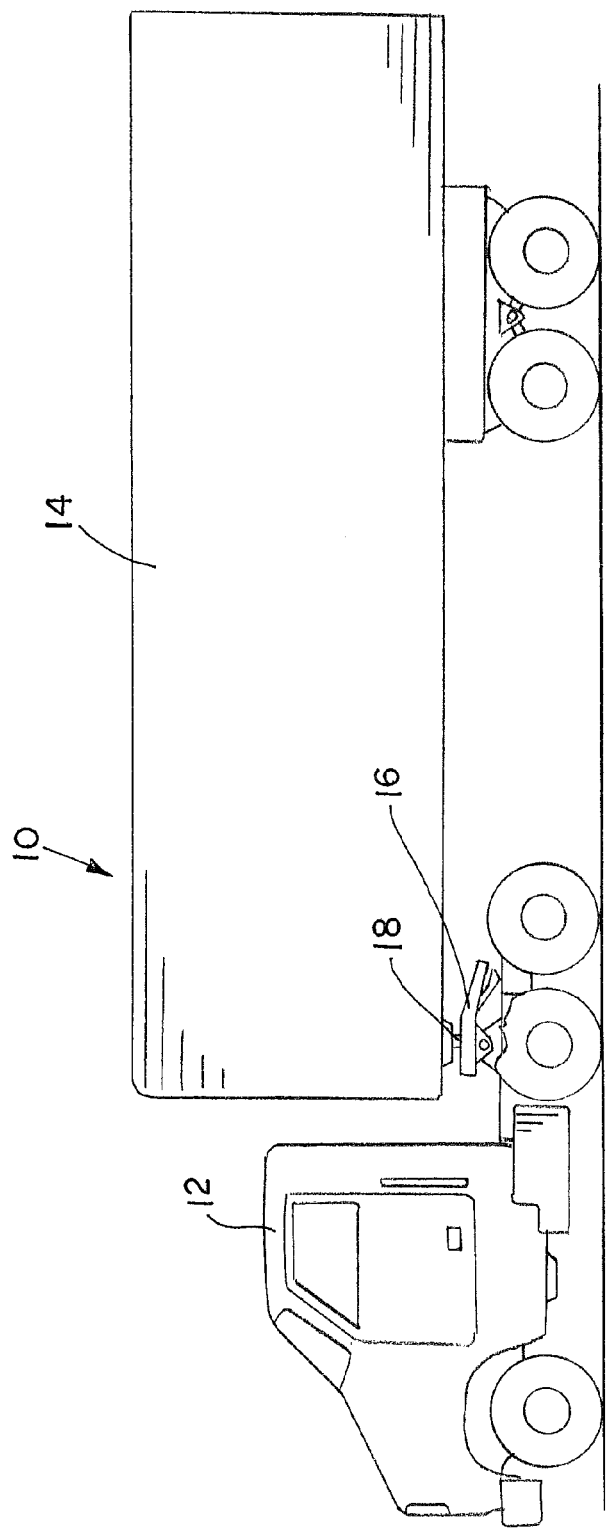
FIG. 1 is a schematic illustration of a tractor trailer combination vehicle in which the tractor and trailer are coupled by a fifth wheel coupling made pursuant to the teachings of the present invention.

Referring now to FIG. 1, an articulated vehicle generally indicated by the numeral 10 includes a tractor section 12 and a trailer section 14, which are coupled together by a fifth wheel coupling generally indicated at 16 mounted on the tractor section 12 and which is made pursuant to the teachings of the present invention. The fifth wheel coupling captures a kingpin 18 mounted on the trailer section 14 and permits the sections to articulate with respect to one another when the sections are coupled together. As will hereinafter be explained, the fifth wheel coupling 16 includes a release which permits the sections 12 and 14 to be separated from one another, and also includes a safety latch that maintains the sections together if the coupling fails because of a component failure or a failure of the sections to properly couple together.

Figure 2:
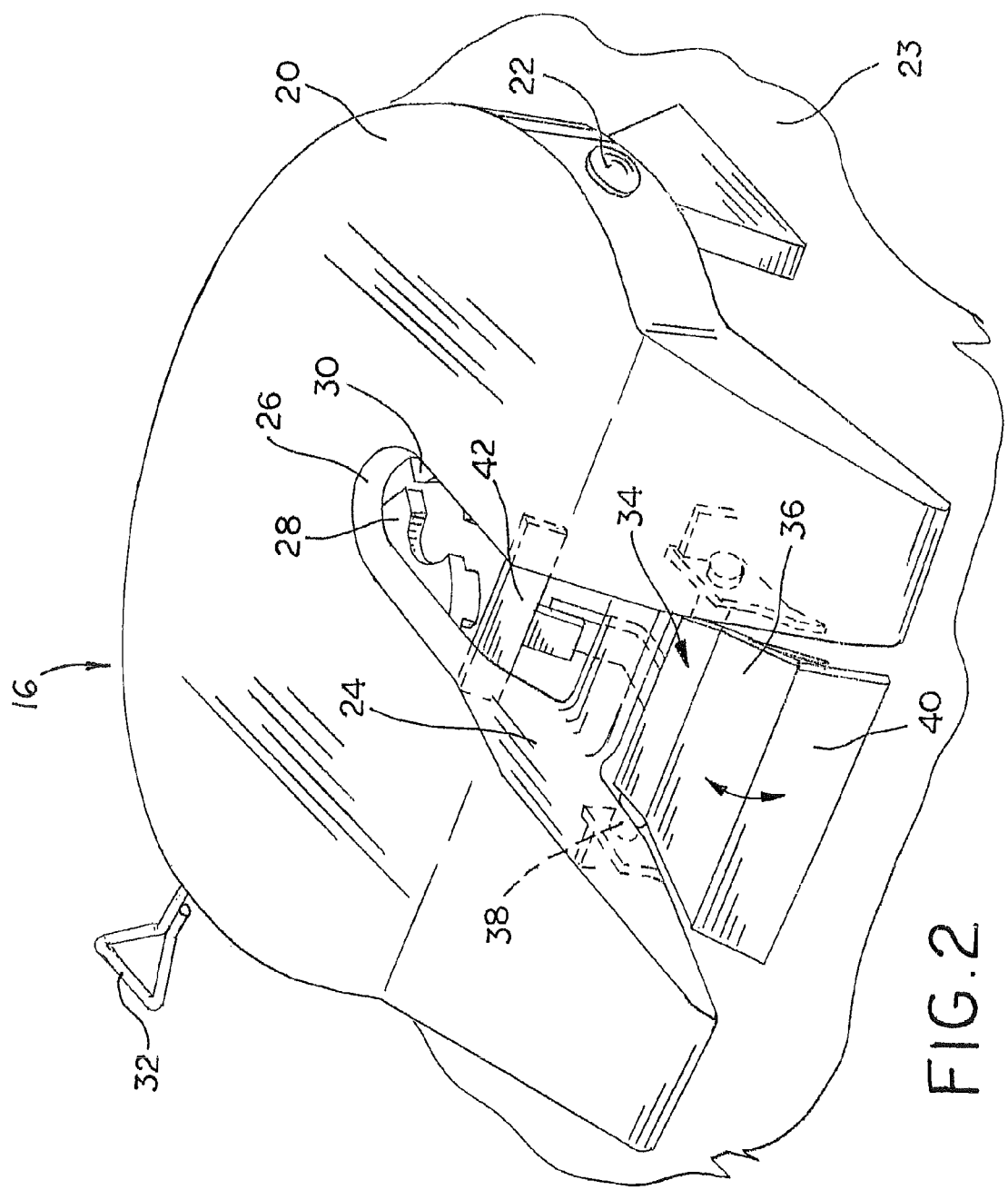
FIG. 2 is a view in perspective of a fifth wheel coupling made pursuant to the teachings of the present invention.
Figure 3:
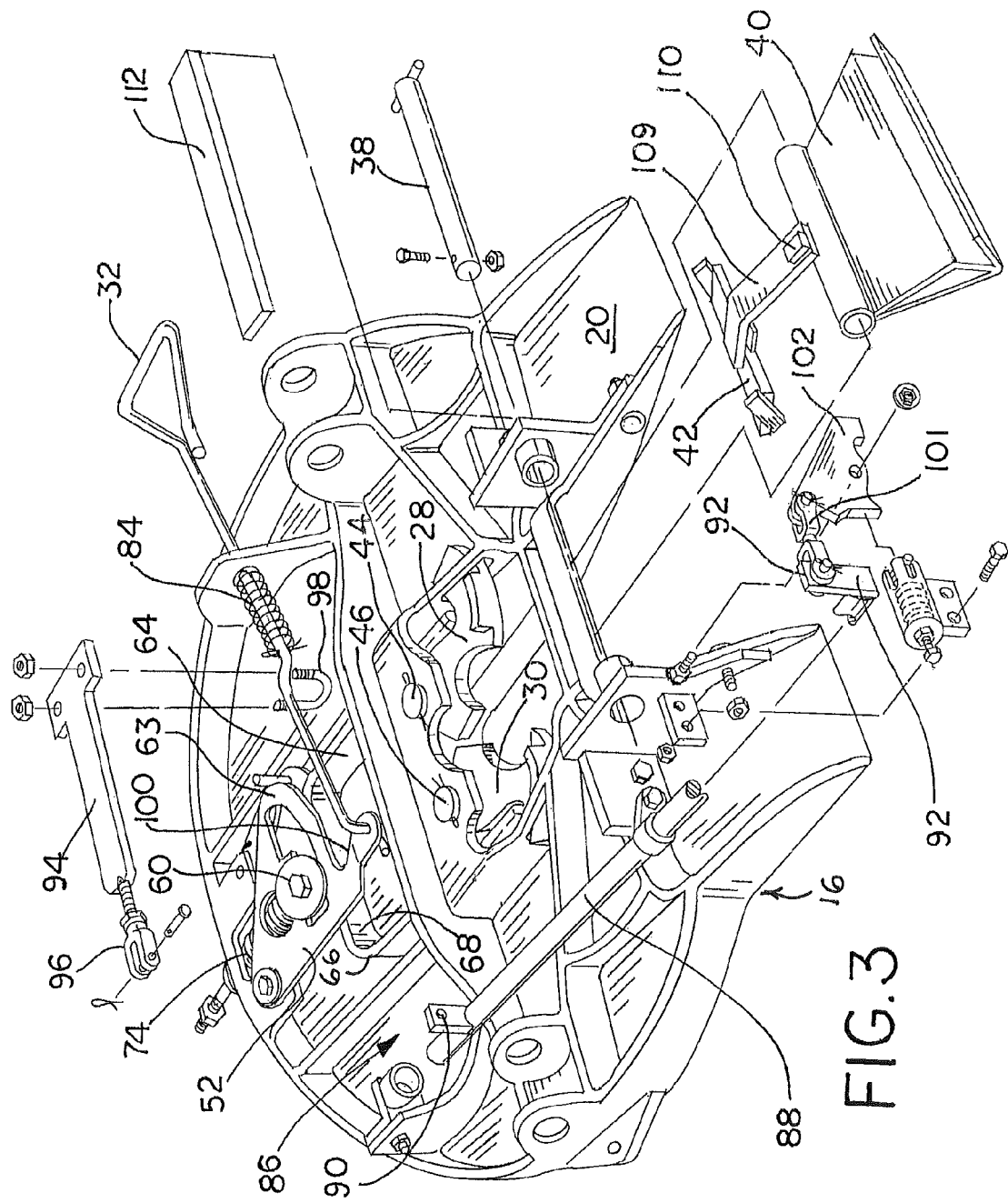
FIG. 3 is an exploded view in perspective, taken from below, of the fifth wheel coupling illustrated in FIG. 2.

Referring now to FIG. 2, the fifth wheel coupling 16 includes a main plate 20 which is pivotally mounted via pivots 22 to a support member 23 mounted on the tractor section 12. The main plate 20 defines a keyhole slot 24, which terminates in a coupling aperture 26. When the tractor section 12 and trailer section 14 are coupled, the kingpin 18 travels through the keyhole slot 24 and into the coupling aperture 26, where it is captured by a cooperating pair of locking jaws 28, 30, which are controlled by a linkage mounted on the underside of the main plate 20, as will be hereinafter described, and which includes a handle 32, which is manually operated. The manner in which the kingpin is secured in the keyhole slot varies depending on the fifth wheel hitch manufacturer, such as Holland or Fontaine. A safety latch 34 prevents accidental dislodging of the kingpin 18 from the keyhole slot 24. The safety latch 34 includes a weighted plate 36 which is pivotally connected in the keyhole slot 24 by pivot shaft 38, which extends across the keyhole slot 24 and is rotatably supported by the main plate 20.

The weighted plate 36 includes a weighted end 40 and an opposite active end 42. The weight of the weighted end biases the latter toward the support member 23, which raises the opposite active end 42 into an active position blocking the keyhole slot 24.

Locking jaws 28, 30 are pivotally connected to the main plate 20 by pivots 44, 46. A spring 48 yieldably urges the locking jaws 28, 30 toward the opened position; that is, toward the position permitting the kingpin 18 to move away from the locking jaws 28, 30. Jaws 28, 30 are held closed in opposition to the spring 48 by a first linkage generally indicated by the numeral 50. First linkage 50 includes a bell crank lever 52 which is pivotally mounted to the main plate 20 by pivot 54. The handle 32 is connected to one lobe 56 of the bell crank lever 52 for rotating the latter above the pivot 54. A horseshoe-shaped member, generally indicated by the numeral 58, is secured to a follower 60, which is rotatably and/or slidably received within slot 62 of bell crank lever 52, which extends into other lobe 63 of bell crank lever 52. The horseshoe-shaped member includes a pair of substantially parallel arms 64, 66 and a transverse arm 68 connecting the arms 64 and 66, and which is also connected to the follower 60. Both of the aims 64, 66 extend from a corresponding arm 70, 72 of the locking jaws 28, 30. A spring 74 bears against pivot follower 60 to urge the latter downwardly viewing the FIGS. 4-6 to also thereby urge the horseshoe member 58 downwardly. Accordingly, the bell crank lever 52 will also be yieldably urged in the clockwise direction viewing FIG. 4. A detent arm 76 is biased against the surface 80 of the bell crank lever 52 by a leaf spring 78. Upon sufficient counterclockwise (see arrows in FIG. 6) rotation of the bell crank lever 52 by pulling handle 32, the detent arm 76 travels around other lobe 63 to yieldably support the bell crank lever 52 in a position holding the horseshoe-shaped member 58 in its upper position permitting the spring 48 to release the kingpin 18. Another spring 84 acts between a web of main plate 20 and handle 32 to bias the latter to the left, viewing FIG. 4.

Figure 11:
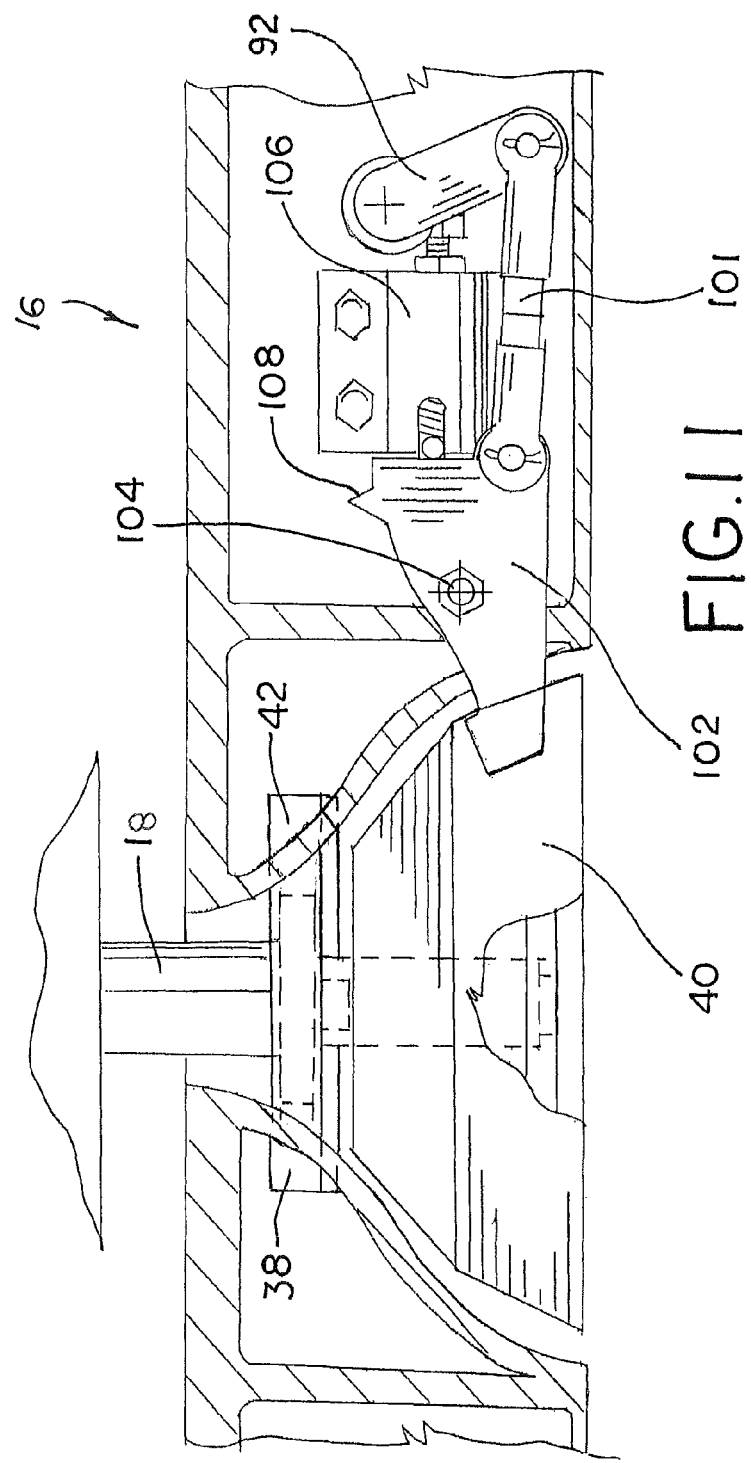
FIG. 11 is a cross sectional view taken substantially along lines 11-11 of FIG. 7, the operating member being shown in its disengaged position permitting the safety latch to remain in its active position.
Figure 12:
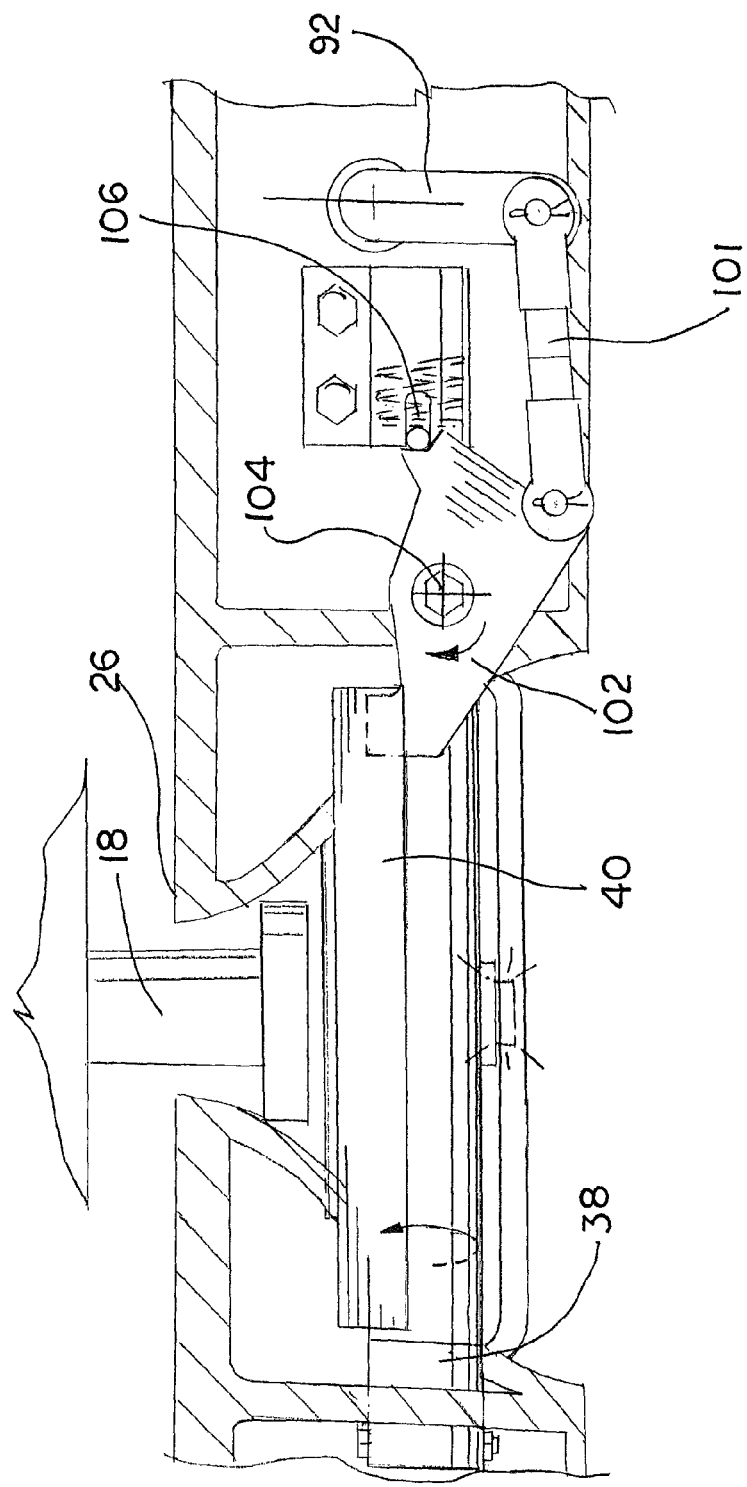
FIG. 12 is a view similar to FIG. 11, but illustrating the operating member deflecting the safety latch into its inactive position.

A second linkage, generally indicated by the numeral 86, includes a shaft 88 which is rotatably mounted on the main plate 20 and is provided with crank arms 90, 92 adjacent opposite ends of the shaft 88. A link 94 includes an end 96 secured to crank arm 90 and an opposite end to which is secured a U-shaped fixture 98 which extends around the handle 32 such that the link 94 is guided for movement along, but is not fastened to the handle 32. It will be noted that, as the bell crank lever 52 approaches the end of its stroke and when the detent arm 76 is traveling around the lobe 63, the U-shaped fixture 98 will be engaged by an engagement surface 100 on the lobe 56 of bell crank lever 52. Accordingly, the link 94 will thereafter be moved by the bell crank lever 52 to rotate the shaft 88 a relatively small increment. This increment will be transmitted, via crank arm 92 and a link 101, to a keeper lever 102 which is pivotally mounted to main plate 20 by a pivot 104. Referring now to FIGS. 11 and 12, rotation of the shaft 88 pivots keeper lever 102 between an inactive position displaced from the weighted end 40 of safety latch 34 (FIG. 11) to an active position in which the keeper lever 102 is engaged with weighted end 40 (FIG. 12) to rotate the safety latch 34 about shaft 38 to its inactive position displaced from the keyhole slot 24 to permit the kingpin 18 to move out of the keyhole slot. A spring loaded latch 106 is mounted on the main plate 20 (FIGS. 11 and 12) and engages a recess 108 in keeper lever 102 when the lever 102 is moved to the upper fit position viewing FIGS. 11 and 12 in which the lever 102 engages weighted end 40 of the safety latch 34 to urge the latter to the inactive position. The keeper lever 102 may be rotated back to the FIG. 11 position only when a torque is applied thereto sufficient to overcome the bias of spring loaded latch 106.

Referring to the safety latch 34, the weighted end 40 is connected to the active end 42 by a link member 109 through which is mounted an abutment 110 adjacent the end of the link member 109 on which the weighted end 40 of the safety latch is mounted. The abutment 110 is adapted to engage cross member 112 which extends across keyhole slot 24. By engaging with the cross member 112, the abutment 110 limits deflection of the active end 42 of the safety latch 34 when the keeper lever 102 is moved to the upper position viewing FIGS. 11 and 12 to engage the weighted end 40 and thereby deflect the upper active end 42 to permit kingpin 18 to move through the keyhole slot 24.

Figure 4:
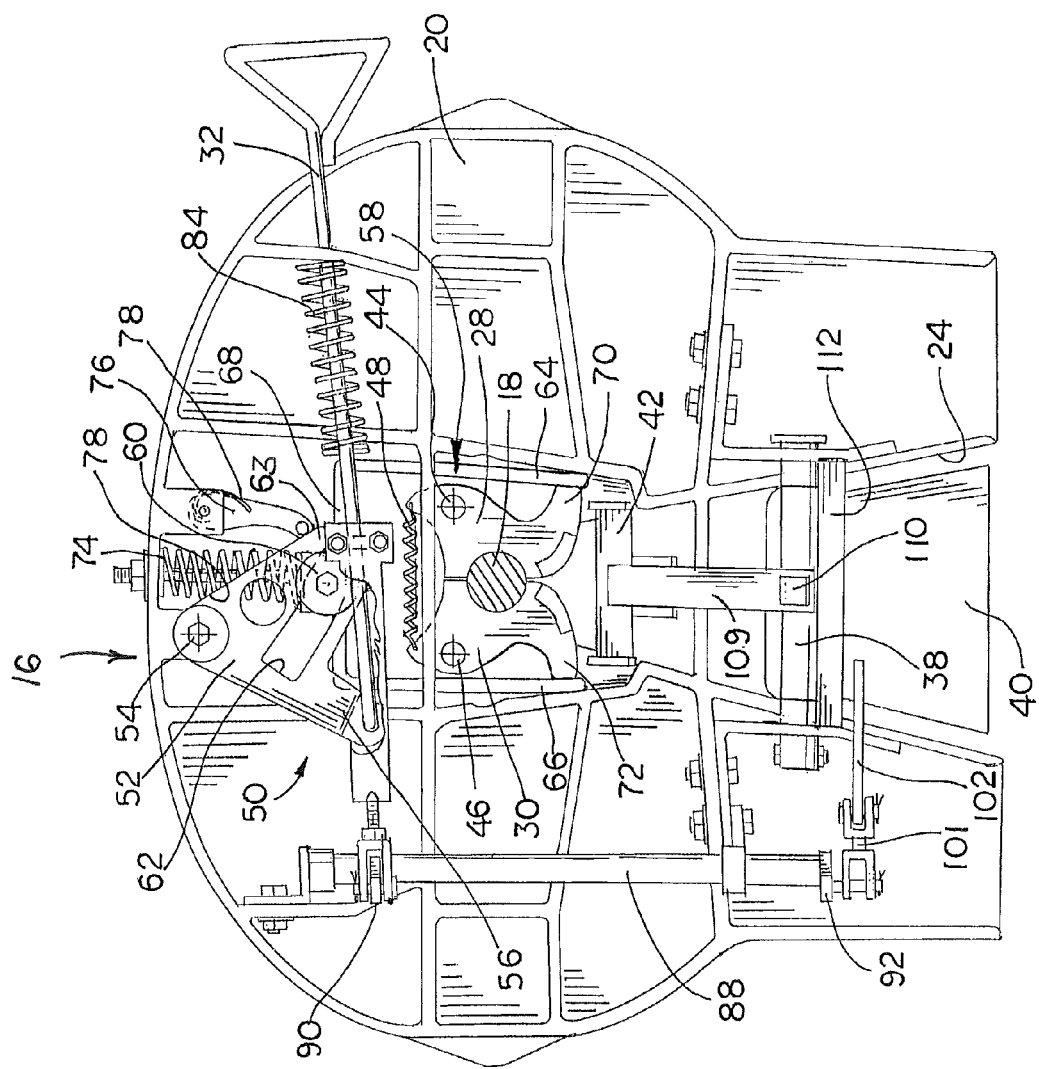
FIG. 4 is a bottom view of the fifth wheel coupling illustrating FIGS. 2 and 3, the various components thereof being illustrated in the position coupling the tractor to the trailer.
Figure 5:
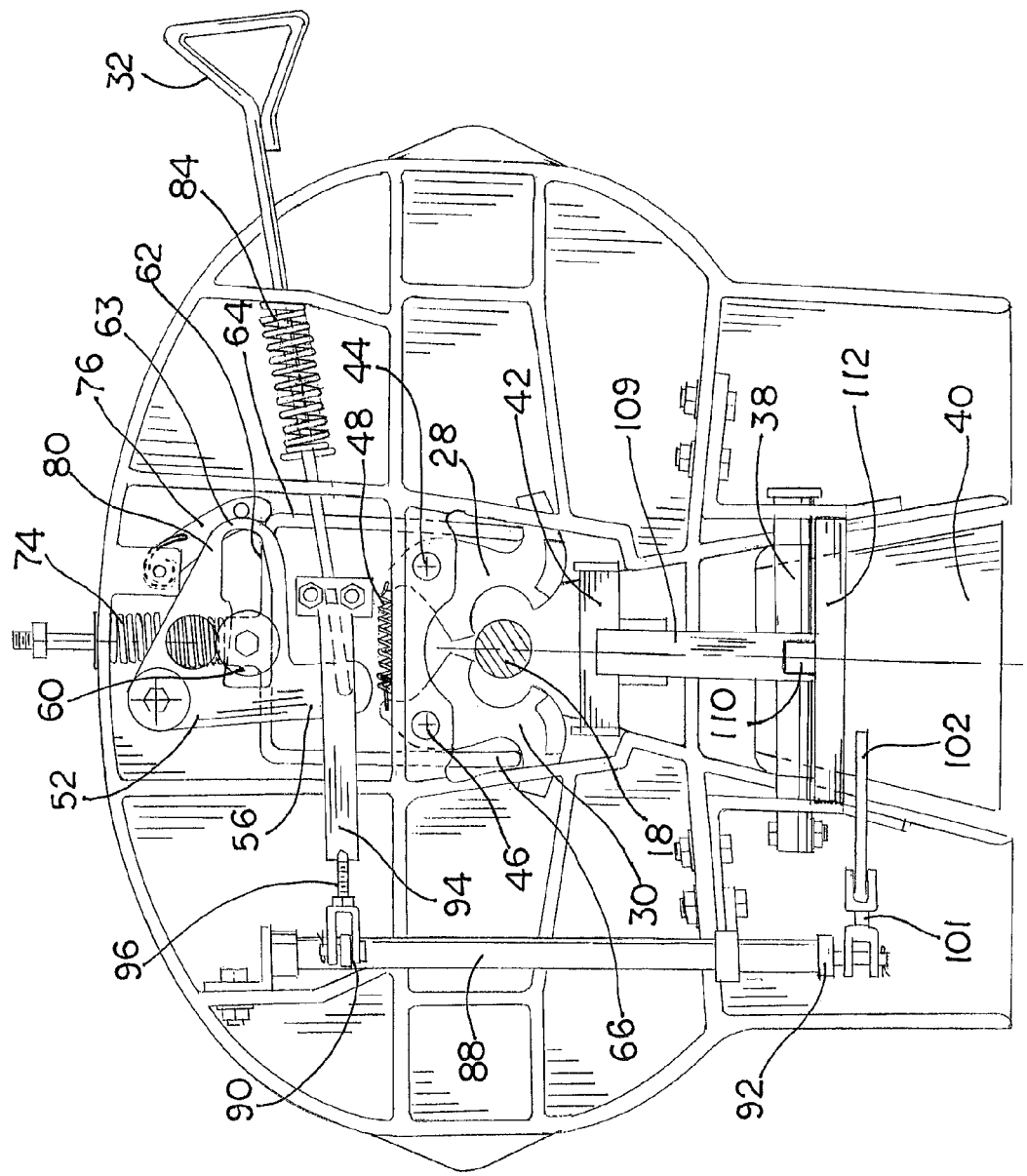
FIG. 5 is a view similar to FIG. 4, but illustrating the locking mechanism of the fifth wheel coupling partially disengaged from the kingpin.
Figure 6:
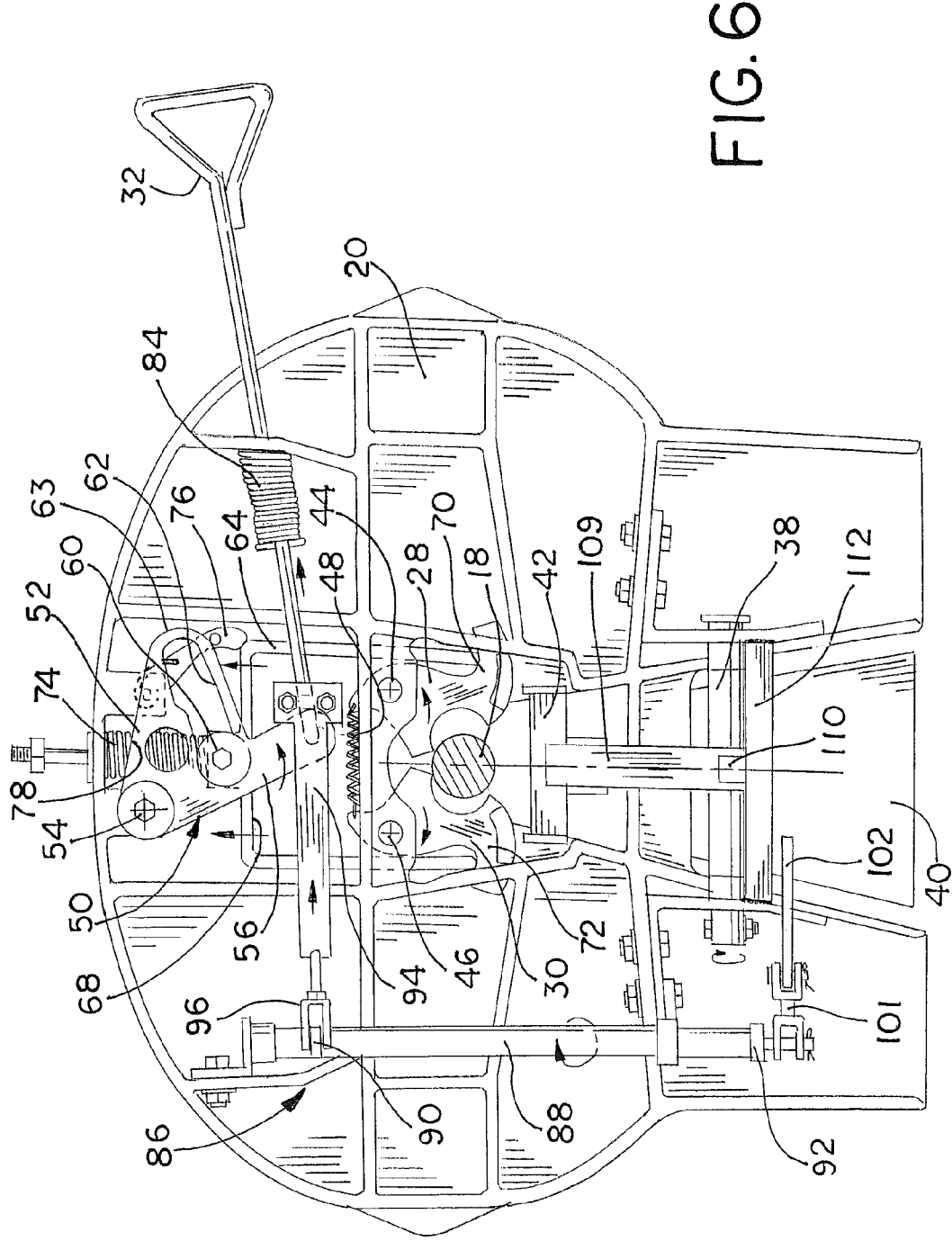
FIG. 6 is a view similar to FIGS. 4 and 5, but illustrating the locking mechanism fully disengaged from the kingpin.
Figure 7:
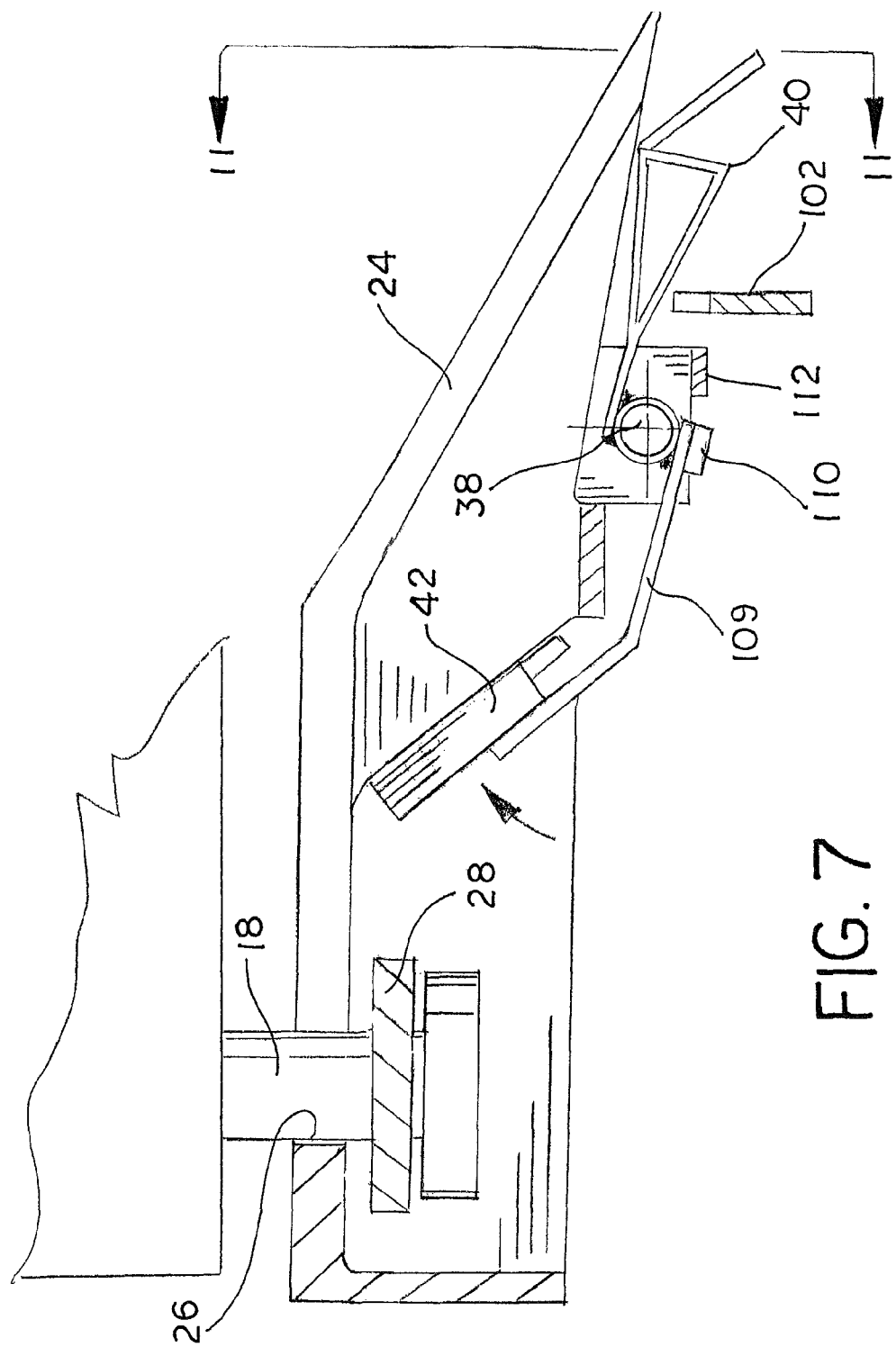
FIG. 7 is a cross sectional view taken through the portion of the fifth wheel coupling illustrated in FIGS. 2-6 including the safety latch, the keyhole slot, and the aperture, the safety latch being illustrated in its active position blocking the keyhole slot.
Figure 8:
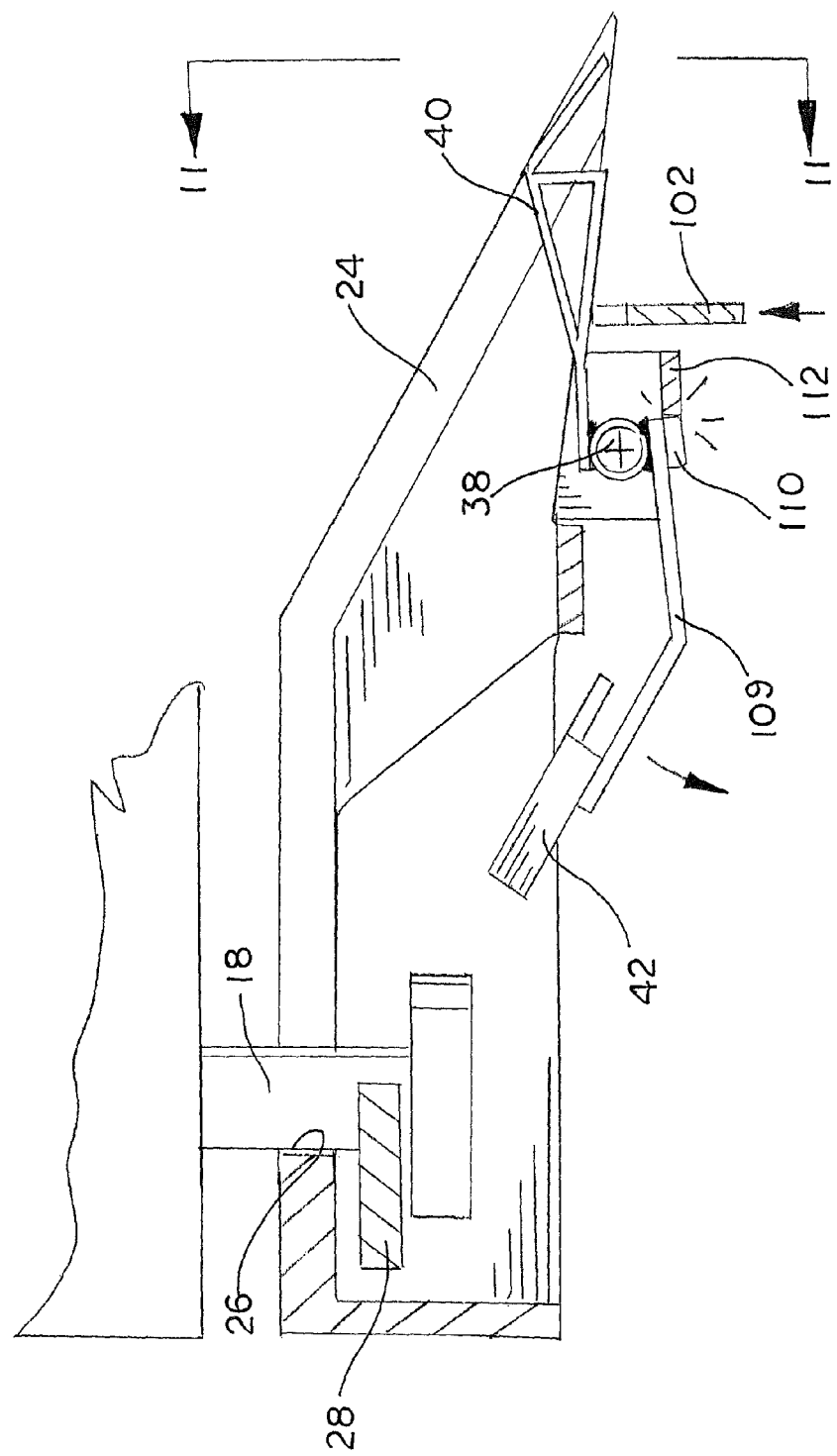
FIG. 8 is a view similar to FIG. 7, but illustrating the safety latch moving into the inactive position, with the kingpin still locked in the locking aperture.
Figure 9:
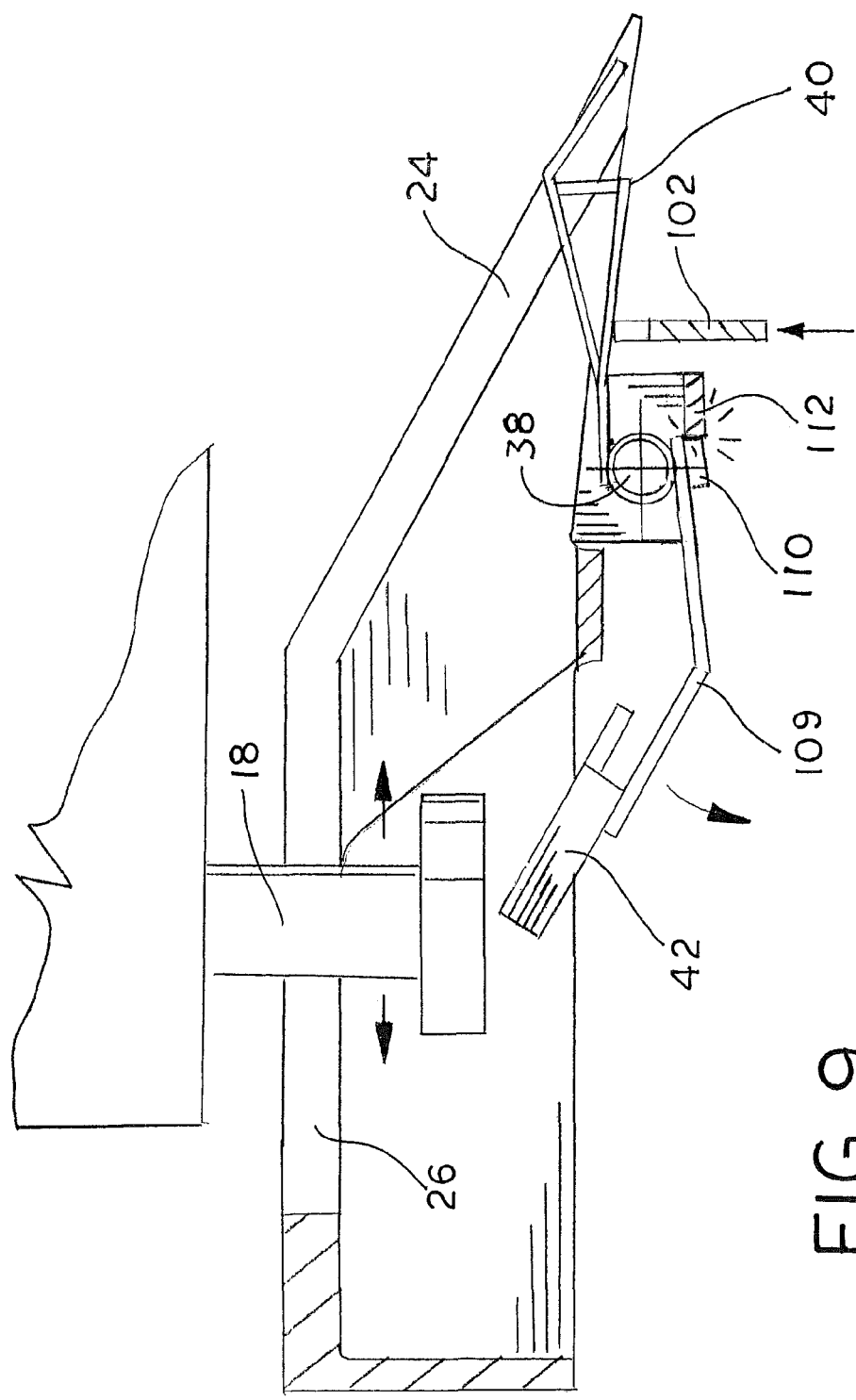
FIG. 9 is a view similar to FIGS. 7 and 8, but illustrating the locking mechanism disengaged and the safety latch in the inactive position to permit movement of the kingpin out of the locking aperture.
Figure 10:
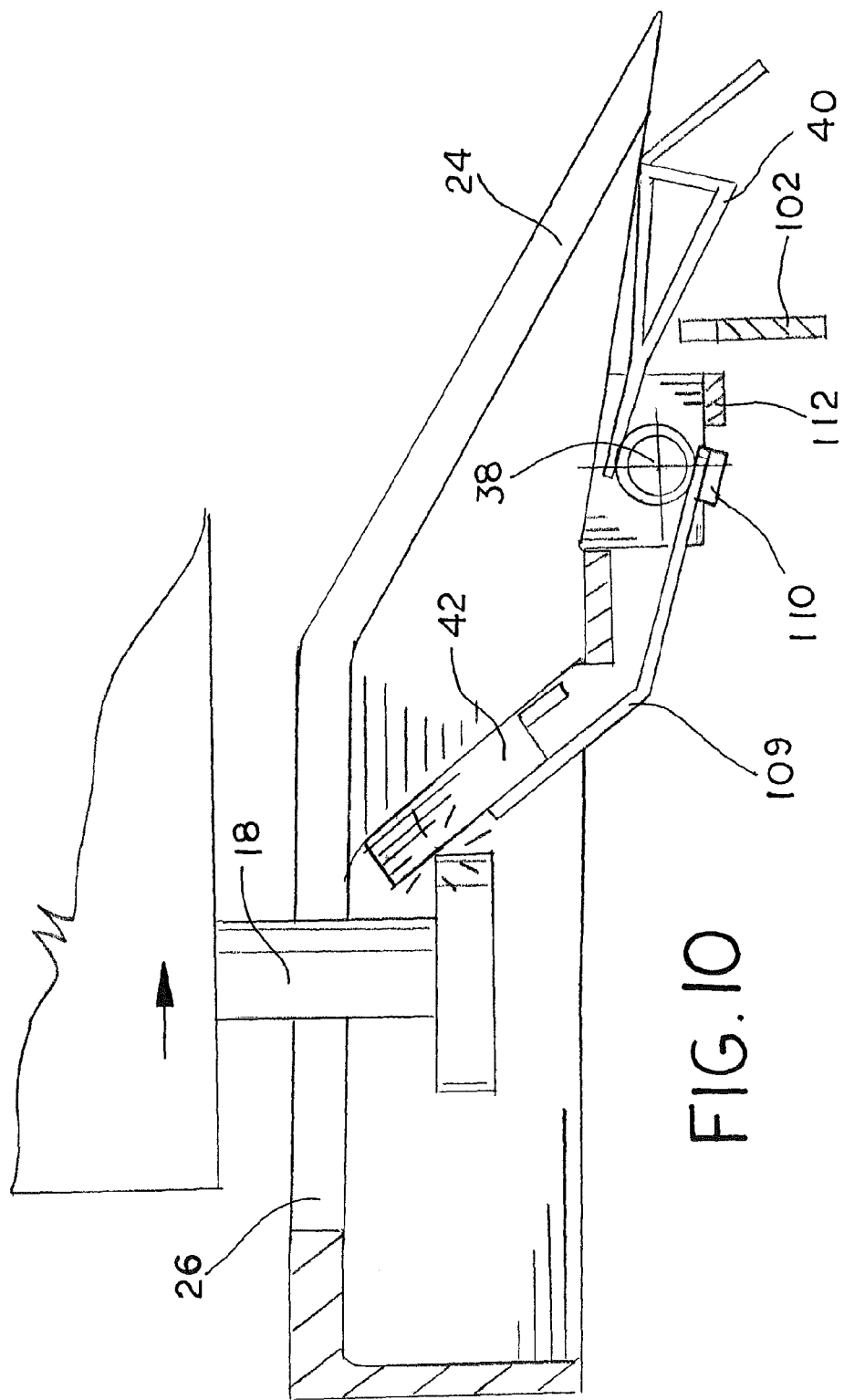
FIG. 10 is a view similar to FIGS. 7-9 but illustrating the safety latch in its active position blocking the keyhole slot and the locking mechanism disengaged from the kingpin.

When it is desired to uncouple the sections of the articulated vehicle 10, the handle 32 is pulled outwardly relative to the main plate 20, thereby rotating bell crank lever 52 to urge the arms 64, 66 upwardly viewing FIGS. 4-6, permitting the spring 48 to open the jaws 28, 30 to thereby release the kingpin 18. At the same time, and as the bell crank lever 52 approaches the end of its stroke, surface 100 engages U-shaped member 98, thereby causing the link 94 to move with the bell crank lever 52 a relatively small increment thereby rotating the shaft 88 a corresponding increment. Rotation of shaft 88 is transmitted through link 101 to rotate the keeper lever 102 from the lowered FIG. 11 position to the raised FIG. 12 position, wherein it engages the weighted end 40 of the safety latch 34 to deflect the latter sufficiently to permit the kingpin 18 to move out of the slot and to thereby permit uncoupling of the sections. Viewing FIGS. 7-10, it will be noted that when the lever 102 is in the lowered position, the weighted end 40 causes the active end 42 to move into a position blocking the keyhole slot 24 to prevent movement of the kingpin 18 through the keyhole slot 24 even if the locking jaws 28, 30 should be released. When the sections are to be recoupled, the tractor section 12 is normally backed into the trailer section 14, such that the kingpin 18 strikes the weighted end 40 with substantial force sufficient to overcome the bias of the latch 106, thereby permitting the keeper lever 102 to be forced to its lowered position releasing the weighted end 40 such that the latter resumes the active position illustrated in FIG. 7. Accordingly, the kingpin is prevented from moving through the keyhole slot 24 even if the locking jaws 28, 30 should fail to latch against the kingpin 18. The kingpin 18 engages the locking jaws 28, 30 with sufficient force to close the locking jaws, 28, 30 around the kingpin 18, which permits the bell crank lever 52 to be urged back to the position illustrated in FIG. 4 due to the action of spring 74. The handle 32 is returned to the latch position illustrated FIG. 4 by spring 84.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Thus, it is understood that it is desirable to protect all the changes in modifications that come within the spirit of the invention.

What is claimed is:

1. Fifth wheel coupling for coupling sections of an articulated vehicle comprising:
    a main plate defining a keyhole slot for receiving a kingpin from one of said sections, said keyhole slot terminating in a coupling aperture;
    a locking mechanism movable between open and closed positions for locking the kingpin in the coupling aperture in said closed position to thereby couple said sections and releasing the kingpin when moved to the open position;
    a safety latch mounted in said keyhole slot and movable from an inactive position permitting said kingpin to move through said keyhole slot and into said coupling aperture to an active position blocking said keyhole slot thereby preventing movement of the kingpin through the keyhole slot;
    an operating mechanism for operating the locking mechanism and for moving the safety latch from the active to the inactive position to permit movement of the kingpin out of said keyhole slot, said operating mechanism including a lever pivotally mounted on an underside of said main plate;
    a first linkage pivotally mounted on said lever and connecting the lever with the locking mechanism, said lever being movable through a predetermined stroke between closed and open positions for moving said locking mechanism between said closed and open positions respectively; and
    a second linkage for moving said safety latch into said inactive position, wherein said second linkage and said lever include cooperating engagement surfaces whereby the pivoting of said lever in excess of a predetermined arc length of said predetermined stroke operates said second linkage.

2. Fifth wheel coupling as claimed in claim 1, wherein said second linkage includes a shaft rotatably mounted on said main plate and an operating member operated by said shaft for moving said safety latch into said inactive position.

3. Fifth wheel coupling as claimed in claim 2, wherein said operating member is pivotally mounted on said main plate.

4. Fifth wheel coupling as claimed in claim 2, wherein said safety latch is biased toward said active position, and a spring loaded latch engages said operating member as the safety latch is moved into the inactive position to retain said safety latch in the inactive position.

5. Fifth wheel coupling as claimed in claim 4, wherein said operating member is pivotally mounted on said main plate and is movable by said second linkage from an inactive position displaced from said safety latch to an active position supporting said safety latch in said inactive position.

6. Fifth wheel coupling as claimed in claim 4, wherein said second linkage includes a link connected to said shaft through a crank arm for turning said shaft to move said operating member, said link being responsive to movement of said lever to turn said shaft.

7. Fifth wheel coupling as claimed in claim 6, wherein said link and said lever include said cooperating engagement surfaces whereby the pivoting of said lever in excess of said predetermined arc length operates said link to turn said shaft.

8. Fifth wheel coupling as claimed in claim 4, wherein a handle is slidably mounted on said main plate and is pivotally connected to said lever for operating the lever, said link being slidably mounted on said handle.

9. Fifth wheel coupling as claimed in claim 8, wherein said first linkage is connected to said lever via a pivot sliding in a slot in said lever.

10. Fifth wheel coupling as claimed in claim 9, wherein said lever is a bell crank lever having a pair of lobes, said handle being connected to one of said lobes, said slot extending into the other lobe.

* * * * *